United States Patent [19]

James et al.

[11] Patent Number: 5,285,273
[45] Date of Patent: Feb. 8, 1994

[54] TRACKING SYSTEM

[75] Inventors: Enoch James; Raymond J. P. Stafford, both of Stevenage, United Kingdom

[73] Assignee: British Aerospace Public Limited Company, London, United Kingdom

[21] Appl. No.: 167,480

[22] Filed: Feb. 19, 1988

[30] Foreign Application Priority Data

Feb. 19, 1987 [GB] United Kingdom ................ 8703931

[51] Int. Cl.$^5$ ...................... H04N 5/225; F41G 5/06; G01J 1/20; G06K 9/32
[52] U.S. Cl. .................................. 348/169; 89/41.05; 89/41.06; 250/203.5; 382/45; 382/47
[58] Field of Search ................................ 358/125, 126; 250/203 CT, 203.5; 89/41.05, 41.06; 382/45, 47

[56] References Cited

U.S. PATENT DOCUMENTS

| | | |
|---|---|---|
| 3,828,122 | 8/1974 | McPhee et al. ..................... 358/126 |
| 3,955,046 | 5/1976 | Ingham et al. ..................... 358/126 |
| 4,272,783 | 6/1981 | Warnstam et al. .................. 358/126 |
| 4,364,089 | 12/1982 | Woolfson ........................ 358/126 X |
| 4,403,256 | 9/1983 | Green et al. ..................... 358/126 X |

*Primary Examiner*—Stephen C. Buczinski
*Attorney, Agent, or Firm*—Nixon & Vanderhye

[57] ABSTRACT

An automatic target tracking system comprising video means, target tracking means, correlation means and aimpoint location means which predicts the subsequent position of a target after each viewing by the video means and then correlates this with the actual viewing of the target position so as to estimate that position within a given field of view.

3 Claims, 2 Drawing Sheets

TRACKING SYSTEM

This invention relates to tracking systems and is more particularly concerned with automatic tracking systems.

According to one aspect of the invention, there is provided an automatic target tracking system comprising:
- video means for forming an image of a viewed scene;
- target tracking means for locating a target within the image of the viewed scene and for predicting the target movement to maintain an updated image of the viewed scene;
- correlation means for correlating the image of a viewed scene with a memory scene containing information relating to the target; and
- aimpoint location means for calculating an aimpoint for the target from the image of the viewed scene, the aimpoint being used to update the target tracking means to maintain tracking of the target.

According to a second aspect of the invention, there is provided an automatic target tracking system comprising sensor means for supplying a video signal indicative of a viewed scene, and computer means including a memory and operable for:
- recording data indicative of the locations of a target within said scene during formation of a plurality of successive video signal fields and using said data to predict the target location during formation of a subsequent video signal field;
- memorising part of a previously received video signal field representative of a portion of the viewed scene containing said target;
- using said predicted target location to identify a search area within said scene expected to contain said target during formation of said subsequent video signal field; and
- correlating said memorised previously received video signal part against a part of said subsequent video signal field representative of said search area in order to identify the actual location of said target during formation of this subsequent video signal field.

For a better understanding of the invention, reference will now be made, by way of example, to the accompanying drawings in which.

Figure 1:
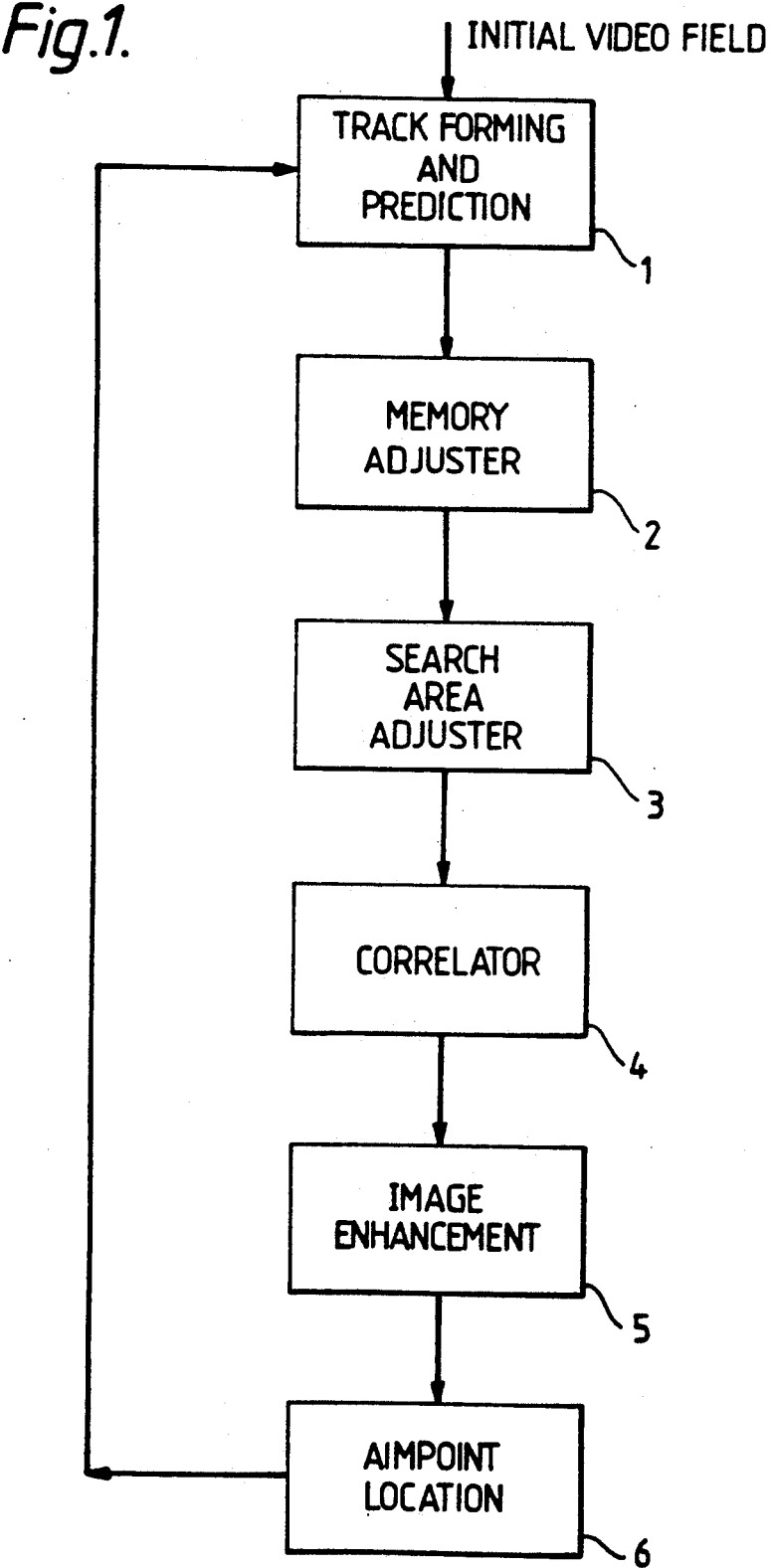
FIG. 1 illustrates a block diagram of a target tracking system.

The tracking system shown in the FIGURE comprises a trackforming and prediction unit 1, a memory scene adjuster 2, a search area adjuster 3, a correlator 4, an image enhancement unit 5 and an aimpoint location unit 6. The system is activated by an initial video field which is supplied to the trackforming and prediction unit 1 from a video camera, for example. The memory scene adjuster 2 samples the previous video field to form a memory scene (which includes a target) which is then used in the correlator 4 to correlate the memory scene with a search area containing the target. The size and location of the search area are computed from the outputs of the trackforming and prediction unit 1 and the memory scene adjuster 2. The correlator 4 locates the region within the search area which most resembles the contents of the memory scene, this region is called the target gate.

The target gate is then decomposed into a binary picture in the image enhancement unit 5 by sampling the intensities of a tracking window which is located around the gate. The binary picture corresponds to a binary target gate where the pixels in the gate are defined as either '1's' or '0's', the '2's' corresponding to the target and '0's' to the background. This binary picture is enhanced at its target outline using spatial operators before being fed to the aimpoint location unit 6.

The unit 6 calculates a skeleton structure from the target image which represents the essential shape characteristics of the target, and an aimpoint is defined as a weighted centroid of the skeleton structure. The aimpoint location is then fed back to the unit 1 to be used to predict a new target position.

Initially, the unit 1 uses the initial video field to produce a target trackform which predicts the target position, but as no previous aimpoint positions are known, a straight line fit is used to predict the new target position and therefore to provide a drive signal for the video camera to maintain tracking of the target. However, after a number of known target aimpoint positions have been determined, the last five consecutive target aimpoint position measurements are used in a second or first order polynomial fit to predict the new target position.

Instead of the previously described series of discrete hardware units for carrying out the respective tracking sub-functions, the tracker could comprise a sensor (for example a thermal imager) for forming a video signal representative of the viewed scene and a computer system, i.e. a single processor system or a system comprising a plurality of processors arranged for serial or parallel processing, the system being programmed to carry out the various sub-functions. The programme could comprise a series of modules as shown somewhat simplified in FIG. 2.

Figure 2:
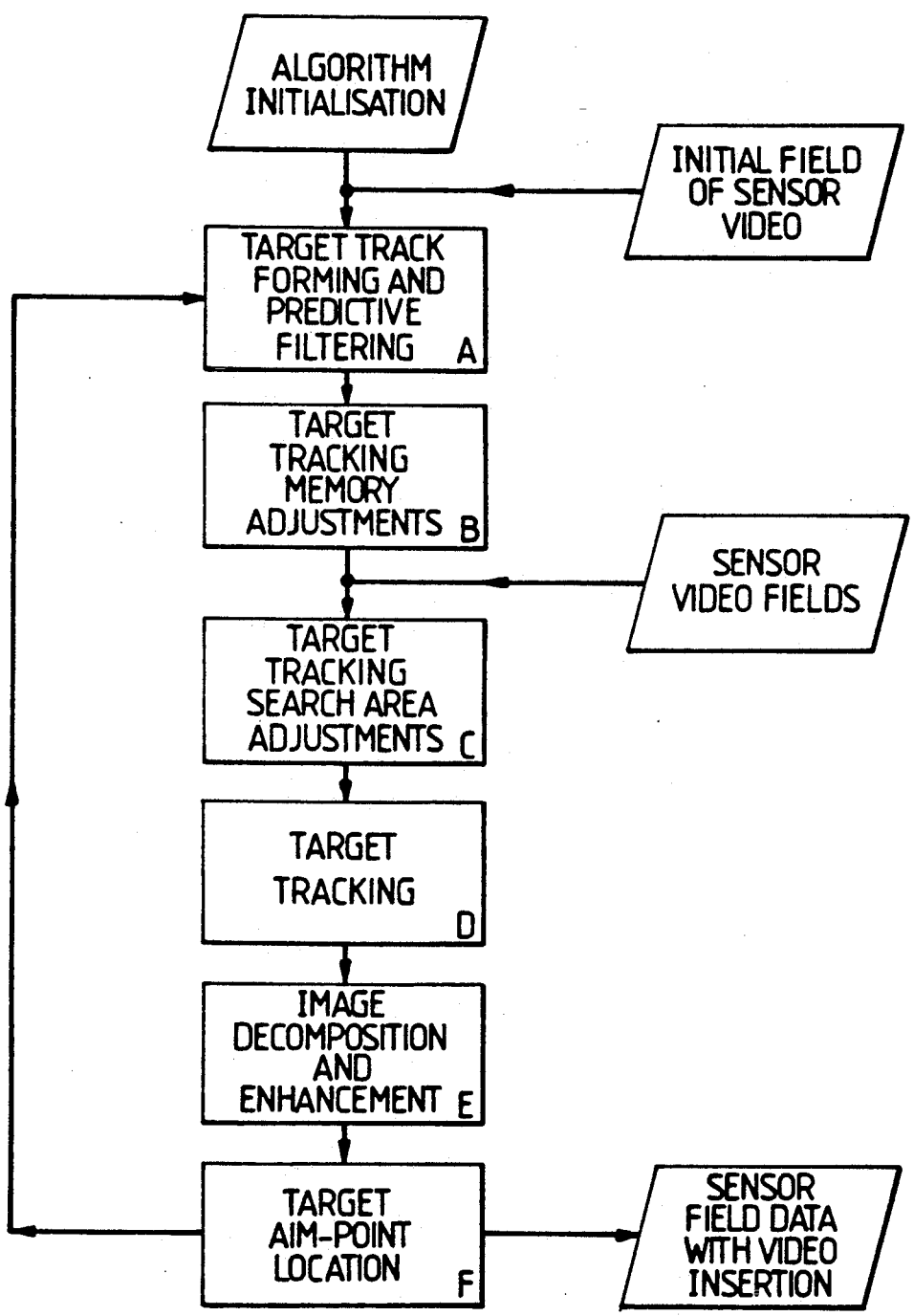
FIG. 2 is a simplified programme comprising a series of modules to implement the sub-functions of the tracking system.

Referring to FIG. 2, Module A provides a track formation and prediction capability for the tracking system. In order to maintain target tracking, it is essential that an accurate prediction of target position is available for each new field of data. This is achieved by producing a track form which consist of a curve being the best fit polynomial equation to the previous target aimpoint plots i.e. it is based on known previous target positions.

This module forms and solves the second order polynomial equations to fit the last five consecutive target aimpoint measurements using least squares. It also uses the second order polynomial fit to calculate the predicted current field target aimpoint and prediction errors to allow the new position of the target to be measured, and also calculates the predicted position of the target, one field update ahead after the current field to drive sensor means (not shown). If however less than five previous consecutive target position measurements are available, a straight line fit using least squares is attempted. The straight line fit is then used to calculate the predicted current field target aimpoint and prediction errors to allow the new position of the target to be measured, and also calculates the predicted position of the target, as described before with reference to the second order polynomial fit.

Although a straight line fit may well be adequate for many tracking tasks, it is considered that the greater prediction accuracy provided by a second order polynomial, when considering target manoeuvre, warrants its use. This is particularly true if a lower rate of information update is chosen.

Module B samples a section of the previous field containing the target and forms a new target memory scene. This is achieved by analysis of x and y projections obtained from the last segmented target gate i.e. the last region within the search area which correlates with the memory scene. The memory is updated for each new data field, and is used in the correlation tracking process which will be described with reference to module D.

This module also updates the target aimpoint and target gate centre position values.

For each update, a search area is defined i.e. a section of the new data field in which the target is somewhere to be found. This is achieved in Module C, the location and size of this search area being computed from the outputs of Modules A and B. The search area is used, in conjunction with the memory scene, in the correlation tracking process.

Module D is required to extract the location of the new target gate from each new field of data. This is achieved by using a locally normalised similarity search which seeks to find the region within the search area which most resembles the contents of the memory scene. This is described in more detail in our copending patent application Ser. No. 8,701,364.

In Module E the target gate is decomposed into a binary picture. This is achieved by defining a tracking window, located around the target date, to sample the background intensities. From this, estimates of the target and background probability density functions are computed, and the target gate, pixels are then defined either as target '1' or background '0'.

From an analysis of the binary target gate, the target image is defined and its outline enhanced using a number of spatial operators. One such spatial operator is described in our copending patent application Ser. No. 8,701,391.

In Module F, the target image is fitted with a skeleton structure which represents the essential shape characteristics of the target. The aimpoint is then defined as a centroid on the skeleton. This information is output to Module A to be used on the trackform. The aimpoint determination is disclosed in our copending patent application Ser. No. 8,701,366.

For the system described, it is assumed that input IR video data will consist of sequences showing a moving target against a stationary background (i.e. no movement of the sensor or imager field of view). The system will process each video field at a 50 Hz update rate.

In order to initialise the system, manual target acquisition is assumed. If system processing is to begin in field N of a video sequence, the following information is required:
(i) The target range availability flag.
(ii) The number of previous target measurements counter.
(iii) The target area in terms of pixels.
(iv) The first field flag.
(v) The telescope magnification used to collect the video sequence.
(vi) The target measurement accuracy.
(vii) The target aimpoint position, in azimuth and elevation, with respect to the boresight (pixels), for fields (N-1) and (N-2).
(viii) The position of the centre of an area in field (N-1), to be used as the first memory scene, with respect to the boresight.
(ix) The position of the target aimpoint in field (N-1), mentioned under (viii).
(x) The position of the target aimpoint in field (N-1), in azimuth and elevation, with respect to the top left hand corner of the memory scene mentioned under (viii).

We claim:

1. An automatic target tracking system comprising:
   imaging means for forming a video signal representative of successive images of a viewed scene;
   target tracking means, coupled to the imaging means, for locating a target within one of said images and for predicting the likely position of said target within a subsequent image;
   correlation means for correlating features of said one of said images with a previous one of said images;
   image decomposition means for selecting the correlating features which relate to the target, and for enhancing these features; and
   aim point location means for determining an aimpoint for the target by analysis of the enhanced correlating features and for updating the target position predicted by the target tracking means.

2. A method of automatically tracking a target utilizing a sensor means for supplying a video signal indicative of a viewed scene, and a computer means including a memory, said computer including the operating steps of:
   recording data indicative of the locations of a target within said scene during formation of a plurality of successive video signal fields and using said data to predict the target location during formation of a subsequent video signal field;
   memorizing at least part of a previously received video signal field representative of a portion of the viewed scene containing said target;
   using said predicted target location to identify a search area, within said scene, expected to contain said target during formation of said subsequent video signal field;
   correlating said memorized previously received video signal part against at least a part of said subsequent video signal field representative of said search area in order to identify the actual location of said target during formation of this subsequent video signal field, and to produce a correlation signal indicative of features in the video signal;
   decomposing the correlation signal to identify and enhance target features present in the correlation signal;
   determining an aimpoint by analyzing the target features; and
   using the aimpoint to further update the prediction of the target location during formation of the subsequent video signal field.

3. An automatic target tracking system comprising sensor means for supplying a video signal indicative of a viewed scene, and a computer means, said computer means including:
   means for recording data indicative of the locations of a target within said scene during formation of a plurality of successive video signal fields and for using said data to predict the target location during formation of a subsequent video signal field;
   means for memorizing at least part of a previously received video signal field representative of a portion of the viewed scene containing said target;

means for using said predicted target location to identify a search area, within said scene, expected to contain said target during formation of said subsequent video signal field;

means for correlating said memorized previously received video signal part against at least a part of said subsequent video signal field representative of said search area in order to identify the actual location of said target during formation of this subsequent video signal field, and to produce a correlation signal indicative of features in the video signal;

means for decomposing the correlation signal to identify and enhance target features present in the correlation signal;

means for determining an aimpoint by analyzing the target features; and means for using the aimpoint to further update the prediction of the target location during formation of the subsequent video signal field.

* * * * *